United States Patent [19]

Ahmed et al.

[11] Patent Number: 4,789,447

[45] Date of Patent: Dec. 6, 1988

[54] APPARATUS FOR WORKING ELECTRICALLY CONDUCTIVE MATERIALS BY ELECTRIC EROSION

[75] Inventors: Mohamed S. Ahmed; Geoffrey Robinson, both of Birmingham, United Kingdom

[73] Assignee: Transfer Technology Limited, Birmingham, United Kingdom

[21] Appl. No.: 57,527

[22] PCT Filed: Oct. 6, 1986

[86] PCT No.: PCT/GB86/00603

§ 371 Date: Jul. 13, 1987

§ 102(e) Date: Jul. 13, 1987

[87] PCT Pub. No.: WO87/01981

PCT Pub. Date: Apr. 9, 1987

[30] Foreign Application Priority Data

Oct. 4, 1985 [GB] United Kingdom ............ 8524600

[51] Int. Cl.⁴ .................... B23H 7/18; B23H 7/32
[52] U.S. Cl. ........................... 204/224 M; 204/225; 219/69 G

[58] Field of Search ............ 204/129.2, 129.25, 129.5, 204/224 M, 225, 212; 219/69 M, 69 G

[56] References Cited

U.S. PATENT DOCUMENTS

| | | | |
|---|---|---|---|
| 3,228,863 | 1/1966 | Wanttaja et al. | 204/129.25 |
| 3,927,293 | 12/1975 | Bell, Jr. | 219/69 G X |
| 4,219,718 | 8/1980 | Sato et al. | 219/69 M |
| 4,287,403 | 9/1981 | Sato et al. | 219/69 G X |
| 4,338,504 | 7/1982 | Gray | 219/69 G X |
| 4,471,199 | 9/1984 | Michishita et al. | 219/69 M |
| 4,527,034 | 7/1985 | Inoue et al. | 219/69 G |
| 4,608,476 | 8/1986 | Shimizu | 204/129.25 X |

FOREIGN PATENT DOCUMENTS 1578779 11/1980 United Kingdom .

*Primary Examiner*—Donald R. Valentine
*Attorney, Agent, or Firm*—Watson, Cole, Grindle & Watson

[57] ABSTRACT

An apparatus is provided for electrical erosion by electrical discharges across the gap between an electrode and workpiece being eroded. A sensor means provides information regarding the electrical condition in the gap.

13 Claims, 2 Drawing Sheets

APPARATUS FOR WORKING ELECTRICALLY CONDUCTIVE MATERIALS BY ELECTRIC EROSION

BACKGROUND OF THE INVENTION

Field of the Invention

The present invention relates to an apparatus and method for working electrically conductive materials by electric erosion, particularly but not exclusively to apparatus for applying a surface finish to a workpiece.

Related Art

The surface texture of some materials, for example sheet metal, can sometimes be of great importance. In the automobile industry, for example, it is important that sheet metal used for the bodywork of cars has a surface texture which produces good results under press and which gives a good appearance to the final paint finish.

Surface texture is usually applied to sheet metal by rolling with steel rolls, the surface texture of the roll being transferred to the sheet metal. The surface parameters of the rolls used are critical and must be closely controlled if the desired surface texture of the sheet metal is to be achieved.

It is known to texture the rolls by a process of blasting the roll surface with steel shot. The process is, however, difficult to control because of the wide range of variables involved, such as shot hardness, velocity and angle of impingement. In addition, it is now the trend to increase the life expectancy of the rolls by using very hard alloy combinations. Shot blast texturing of these hard rolls is very difficult.

It has previously been proposed to use the technology of electro-discharge machining (E.D.M.) to texture the surface of the rolls. This involves placing an electrode adjacent a roll to be textured and applying a pulse voltage across the gap, (usually though an electrolytic fluid) between the roll and electrode. A spark discharge will occur at the point where the electrode and roll are closest, the spark heating the surface of the roll and creating a minute crater therein. Repeated discharges at high frequency cause steady high-energy electrical discharges which produce many minute craters per second in the roll at various points on the roll surface, depending which point is closest to the electrode at the time, resulting in a uniform surface finish. E.D.M. is very controllable and is easily able to surface texture hard rolls.

SUMMARY OF THE INVENTION

It will be apparent that the positioning and shape of the electrode, as well as the number and strength of the electrical discharges, will have a critical effect on the surface texture of the roll.

In particular, if there occurs any unevenness in the relative attitudes of the electrode and workpiece, this will effect the overall shape of the machined surface of the workpiece. For example; if the electrode becomes tilted such that one end of the electrode is closer to the workpiece, than the other end, then discharge will occur much more at the closer end and the workpiece will become unevenly machined. This is undesirable (unless of course such an unevenly machined workpiece is the desired end result, but in this case an undesirable result would be produced if the electrode were parallel to the workpiece). It is therefore apparant that it would be advantageous to the relative orientations of the electrode and workpiece could be monitored to give an indication of the orientation at any time, so that steps could be taken if the electrode and workpiece become orientated undesirably relative to each other. Maintaining correct orientation is very important to ensure correct machining.

Preferably, a number of sensors are used to obtain different types of information regarding the electrical conditions in the gap between the electrode and workpiece. Preferably, spark sensors arranged at intervals along the gap are used to provide information of where along the gap electrical discharges are occuring, so as to give an indication of the relative orientation of the electrode and workpiece. Ajustment of the relative orientation may then be made in the light of this information.

Further, it is also preferred that sensors be arranged to provide information regarding the condition of the electrical discharges occurring along the gap as this will affect the actual machining of the workpiece and the surface texture being applied to the workpiece. The information can be used to alter the machining conditions so as to keep the conditions within the machining parameters chosen initially.

The present invention provides a method of machining a workpiece by a process of electrical erosion, comprising the steps of;

moving an electrode to a position adjacent an electrically conductive workpiece to be machined leaving a gap between the electrode and the workpiece across which electrical discharges may occur;

applying a voltage between the electrode and workpiece to cause electrical discharges to occur across the gap;

giving an indication of the relative orientation of the electrode and workpiece with respect to each other by determining by sensor means at what position along the gap the discharges are occurring;

making any necessary adjustments of the orientation in accordance with the indication given.

The present invention further provides apparatus for working electrically conductive materials by electrical erosion comprising an electrode arranged to be placed next to an electrically conductive workpiece to be machined, leaving a gap across which electrical discharges may occur, means for applying a voltage between the electrode and workpiece to cause electrical discharges to occur, and sensor means for providing information regarding the electrical conditions in the gap.

The condition of the electrical discharges is preferably given by monitoring the voltage strength of the discharges.

Voltage is applied between the electrode and workpiece by means of a series of voltage pulses and the voltage monitoring means preferably acts by sampling the discharge voltage rather than by taking an average of the discharge voltage. This has the advantage of providing better control information for the system, as a determination of the average voltage may not show up what could be significant differences between the values of individual discharge voltage pulses.

Providing means for determining the respective orientations of the workpiece and electrode has the advantage that uneven machining of the workpiece can be prevented by making sure the workpiece and electrode are correctly oriented with respect to each other, preferably on setting up the roll in the machine.

This may be done manually or the servo system may be arranged to control movement of the electrode, and sensor means for determining the orientation of the electrode with respect to the workpiece can be used to provide control information for the servo system, as well as other parts of the apparatus.

The voltage monitoring means can be used to provide information for control of the electrical erosion process generally.

BRIEF DESCRIPTION OF THE DRAWINGS

Features and advantages of the present invention will become apparent from the following description of an embodiment thereof by way of example only, with reference to the accompanying drawings, in which.

DETAILED DESCRIPTION

Figure 1:
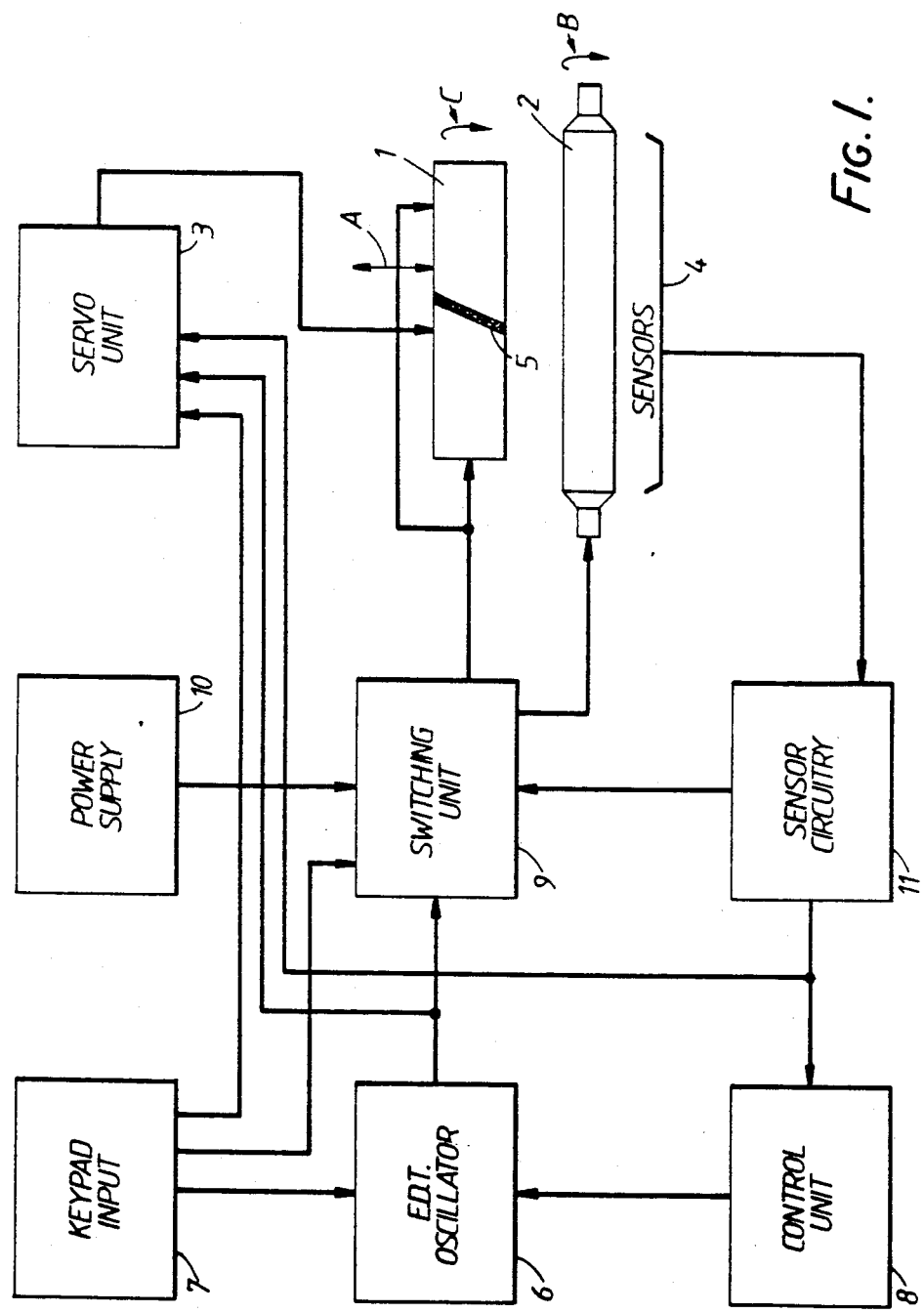
FIG. 1 showns a shematic block diagram of apparatus for working electrically conductive materials by electric erosion in accordance with the present invention.

With reference to FIG. 1 an electrode 1 is shown adjacent an electrically conductive workpiece 2, which may be a roll intended for use in the milling of sheet metal. A servo unit 3 is arranged to move the electrode 1 towards or away from the workpiece 2, as shown by arrow A. Sensors 4 and sensor circuitry 11 are arranged to monitor the orientation of the electrode 1 with respect to the workpiece 2, and to monitor various conditions of electrical discharges occurring in the gap between the workpiece 2 and electrode 1 such as gap voltage. Information provided by the sensors 4 is used to control the electric erosion process.

In more detail, the workpiece 2 is arranged to rotate (arrow B) in a tank (not shown) where it is covered continuously with a thin film of a dielectric liquid. The electrode (2) is also arranged to rotate (arrow C) and consists of a number of conductive segments, for example graphite or copper, in this case two, separated by an insulating strip 5. The insulating strip leans at an angle with respect to a vertical through the electrode, as illustrated. Arranging the strip in this way means that there will not be a part of the workpiece which is not machined. An electric oscillator unit 6 is arranged to generate electric pulses of selected pulse width (on time and off time) chosen via a keypad input 7, and under the control of a control unit 8. A switching unit 9 is arranged to switch electric power from a power supply 10 across the gap between the electrode 1 and workpiece 2 in accordance with the pulses from the oscillator 6. The power supply may be a power supply such as, for example the TransTee EOM/EDT 30 amp 150 volt. The machining performance is monitored by the various sensors 4 to control the electric erosion process via sensor circuitry 11. the servo unit 3 controls the displacement of the electrode 1 with respect to the workpiece 2, in particular it controls the distance between the electrode and workpiece, via a servo head (not shown), in accordance with the condition of the gap and the selected machining parameters (input via the keypad input).

For example, depending on the machinery, parameters, the electrode may be positioned closer to or further away from the workpiece. Different distance will give difference finishes to the workpiece, or will cause the workpiece to be machined faster or slower. The sensors 4 will monitor the condition of the electrical discharges occurring in the gap, (e.g. by monitoring gap voltage) and the sensor circuitry 11 and control unit 8 can decide whether the conditions are in accordance with the machining parameters and if not action can be taken (e.g. via the oscillator servo unit or manually) to make corrections until the conditions are in accordance with the chosen machining parameters. A display may be provided giving a visual display of the conditions so that action may be taken manually.

The switching unit 9 preferably includes MOSFET power devices to control switching. These have the advantage of being fast, voltage controlled devices which can be directly driven by logic circuitry, and have positive temperature coefficients.

In operation, when voltage pulses are first applied to the gap between the workpiece 2 and electrode 1 an open circuit condition applies. The servo unit 3 moves the electrode 1 towards the workpiece until sparking occurs. Monitoring of the condition of the electrical discharges in the gap allows control of the servo unit 3 and the number of voltage pulses applied.

In accordance with the present invention, sensors are provided which give an indication of the respective orientations of the workpiece 2 and electrode 1. The electrodes utilised in an E.D.M. process can be very long, particularly the electrodes used for machining rolls to be used in the sheet metal milling industry. Particularly with such long electrodes, in the order of 90" long, it is possible that one end of electrode could be positioned closer to the workpiece than the other end, resulting in more sparking from the one end of the electrode and consequent uneven machining of the workpiece. In the present invention sensors are arranged to monitor and give an indication of the respective orientations of workpiece so that action may be taken to make any corrections in orientation which may be necessary. Action may include adjustments of the orientation manually or by way of the servo means. A display may be provided to show the information given by the sensors.

In the embodiment illustrated in FIG. 1 a number of spark sensors (only shown schematically) are arranged along the gap between the electrode 1 and workpiece 2. Preferably, the number is 3, one sensor being positioned in the centre of the gap and the other two sensors being positioned towards the ends of the gap. The spark sensors are arranged to detect sparking in their vicinity between the electrode 1 and workpiece 2. If, for example, the electrode 1 is not parallel to the workpiece 2 more sparking will occur at one end of the gap than the other.

Preferably, on initial setting up of the electrode for the machining process the electrode is caused to approach the workpiece by the servo means until sparking occurs. The spark sensors give an indication of whether the orientation of the electrode with respect to the workpiece is as desired, that is if all three spark sensors are detecting equal amounts of sparking, then the respective orientations will be correct. If not, and one end indicates more spark than the rest, then the servo means will cause the electrode to back away from the workpiece, and the orientation of the electrode can then be adjusted manually.

It will also be appreciated that it would be possible to adjust the orientation automatically by means of appropriate electronics and servo control. For example, appropriate servo control could correct the orientation automatically in response to information from the spark sensors.

It will also be appreciated that as well as being able to determine whether the electrode and workpiece are parallel to each other in the vertical plane it is also possible to use the sensors to determine whether they are parallel in a horizontal plane. In other words the complete relative orientation can be determined.

The spark sensors could also be used to provide control for other parts of the apparatus, such as for example, the switching unit 9, preventing the switching of power across the gap when uneven machining is occuring.

In accordance with the present invention the voltage across the gap between the electrode 1 and workpiece 2 is also monitored, to determine the condition of the electrical discharges occurring.

The variation in gap voltage in accordance with the various texturing conditions is best illustrated by reference to FIG. 2. Reference numeral 14 indicates a graph showing gap voltage during various texturing conditions (reference numeral 12). A graph 15 shows electrode displacement relative to the roll for the various texturing conditions.

During open circuit, when the electrode is distanced from the workpiece the gap voltage corresponds to the pulse voltage applied by the switching unit across the electrode and workpiece (shown by reference a). The electrode is brought closer to the workpiece until sparking occurs, and the gap voltage drops to level shown by reference letter b. Machining of the workpiece is taking place at this time. If the electrode and workpiece get closer together arcing can occur resulting in unstable texturing, the gap voltage dropping to the level shown by reference letter c. If the workpiece and electrode touch a short circuit occurs and the gap voltage drops to the level shown by reference letter d.

It can be seen that gap voltage is indicative of the machining conditions in the gap between the electrode and the workpiece, and therefore if the gap voltage is monitored accurately machining conditions can also be controlled accurately to stay within the machining parameters chosen (by way of the keypad input 7)

In accordance with the present invention the gap voltage is determined by a process of sample and hold, rather than by a determination of the average gap voltage so that the off time of the voltage pulse is not considered. If an average voltage is determined instead by taking into account off time the control information provided is not nearly as precise. The sample and hold method gives accurate measurement of the gap voltage for control purposes. The sample and hold is delayed so that the large spikes at the beginning of the voltage pulse are not considered.

With reference again to FIG. 1 sample and hold circuitry in the sensor circuitry 1 samples the gap voltage. The sample and hold is delayed by in the region of 1us so as not to record the large voltage spike, and holds at the instant of switch off of the voltage pulse.

It will be appreciated that conventional electronic circuitry may be used for the sample and hold, as will be known by a person skilled in the art. The determine gap voltage can then be used for control of any of the machining conditions, for example on-off time of voltage pulse, servo unit 3, switching unit 9, so that machining is done in accordance with the desired machining parameters. Also, if, for example, a short circuit occurs the sample and hold would see the drop in gap votlage and cause the switching unit 9 to stop supplying voltage pulses to the gap, and at the same time activate the servo unit to cause the electrode 1 to back away from the workpiece 2. These functions may be controlled automatically by control unit 8 in accordance with the information provided by the servo.

Figure 2:
FIG. 2 shows a number of line graphs illustrating the changes in various voltage gap parameters under different texturing conditions.
Figure 2:
Figure 2:
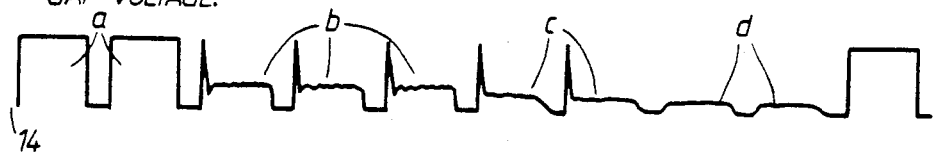
Figure 2:
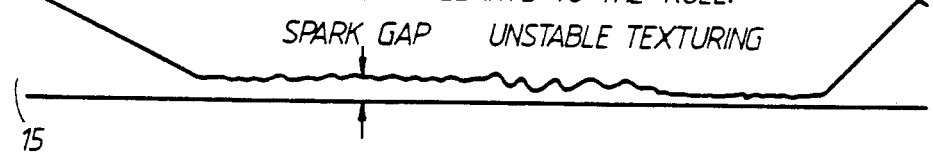
Figure 2:
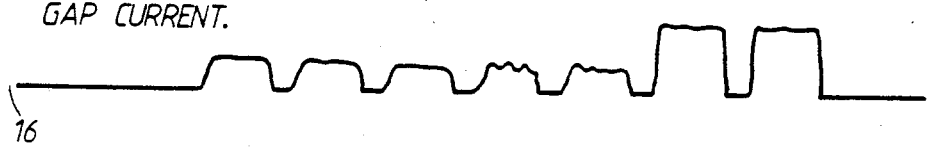

With reference to FIG. 2 it will also be noted the gap current (reference numeral 16) can provide an indication of some gap conditions.

Also, radio signals (reference numeral 13) are emitted from the gap each time current flows, the amplitude varying depending on the gap voltage. These may also be used to control machining conditions.

The entire E.D.M. system may be microprocessor controlled- the information from the sensors being input to the microprocessor (along with information from the keypad) to control machining conditions.

It will be appreciated that the present invention is not suitable only for applying surface texture to rolls to be used in the milling industry, but may be used in general for shaping and texturing any conductive article.

It will also be appreciated that the shape of the electrode may be different from that specifically described in the specific embodiment disclosed, as may the number of segments of which the electrode consists.

It should also be noted that it need not be the electrode which is moved in relation to the workpiece by the servo means, the workpiece could be moved instead. Alternatively, both could be under servo control.

It is also not necessary that the workpiece need be immersed in dielectric liquid. A mere air-gap may be sufficient for some forms of E.D.M.

The E.D.M. machine in accordance with the present invention, because the machining conditions and relative orientations of workpiece and electrode can be accurately and closely controlled, can perform the necessary machining functions to give a high quality of finish.

The two most important surface texture parameters surface roughness and peak density can be independently controlled with a high degree of accuracy and repetion.

It will be appreciated from the foregoing description that the present invention provides two major aspects;

The first aspect relates to the control of the relative orientations of the electrode and workpiece with respect to each other by providing means which are able to monitor the relative orientations so that any necessary action to correct or adjust the orientation may be taken.

The second aspect relates to control of the texturing conditions in the gap between the electrode and workpiece by providing means for giving an indication of the condition of the electrical discharges occurring between the electrode and workpiece, so that any necessary adjustments of the texturing conditions may be made in accordance with the information provided by the sensors and the machinery parameters which have been chosen.

What is claimed is:

1. Apparatus for working electrically conductive materials by electrical erosion, comprising an electrode adapted to be placed next to an electrically conductive workpiece to be machined, leaving a gap across which electrical discharges may occur, means for applying a voltage between the electrode and workpiece to cause electrical discharges to occur, and sensor means for detecting the positions at which electrical discharges are occurring along the gap to give an indication of the relative orientation of the electrode and workpiece with respect to each other.

2. Apparatus in accordance with claim 1, wherein the sensors are spark sensors arranged at predetermined intervals.

3. Apparatus in accordance with claim 2, wherein there are provided three spark sensors, arranged one in the centre of the gap and one at each end of the gap.

4. Apparatus in accordance with claim 1, wherein the sensor means include means to give an indication of the condition of any electrical discharges occurring between the electrode and the workpiece, to provide control information for controlling the texturing conditions in the gap.

5. Apparatus in accordance with claim 4, wherein the means to give an indication of the condition of any electrical discharges comprises means for giving an indication of the discharge voltage.

6. Apparatus in accordance with claim 5, wherein the giving means comprises a sample and hold circuit to sample the discharge voltage when electrical discharges are occurring.

7. Apparatus in accordance with claim 6, wherein the giving means samples the discharge voltage after a set time delay to avoid sampling the large voltage spikes which occur prior to a discharge.

8. Apparatus in accordance with claim 4, wherein the means to give an indication of the condition of any electrical discharge monitors the electrical discharges emitted from the gap each time a discharge occurs.

9. Apparatus in accordance with claim 4, wherein said means for providing an indication of the condition of any electrical discharge is a means for monitoring the electrical current through the gap.

10. Apparatus in accordance with claim 1, wherein there is provided control means responsive to the sensor means and to operating parameters input to the control means to control the machining conditions.

11. Apparatus in accordance with claim 10, wherein there is provided servo means to move the electrode and workpiece relative to each other and being responsive to the control means.

12. Apparatus for working electrically conductive materials by electrical erosion, comprising an electrode adapted to be placed next to an electrically conductive workpiece to be machined, leaving a gap across which electrical discharges may occur, means for applying a voltage between the electrode and workpiece to cause electrical discharges to occur, means for giving an indication of the discharge voltage of the electrical discharges to provide control information for controlling the texturing conditions in the gap, and said giving means comprising a sample and hold circuit to sample the discharge voltage of the electrical discharges.

13. Apparatus in accordance with claim 12, wherein said giving means samples the discharge voltage after a set time delay to avoid sampling the large voltage spikes which occur prior to discharge.

* * * * *